(12) United States Patent
Murch

(10) Patent No.: US 11,772,832 B1
(45) Date of Patent: Oct. 3, 2023

(54) MOBILE PACKAGING SYSTEM AND METHOD

(71) Applicant: Brian Alexander Murch, Needham, MA (US)

(72) Inventor: Brian Alexander Murch, Needham, MA (US)

( * ) Notice: Subject to any disclaimer, the term of this patent is extended or adjusted under 35 U.S.C. 154(b) by 0 days.

(21) Appl. No.: 17/523,531

(22) Filed: Nov. 10, 2021

Related U.S. Application Data

(60) Provisional application No. 63/113,600, filed on Nov. 13, 2020.

(51) Int. Cl.
  *B65B 5/02* (2006.01)
  *B65B 5/04* (2006.01)
  *B65B 57/12* (2006.01)
  *B65C 1/02* (2006.01)
  *B65B 43/08* (2006.01)

(52) U.S. Cl.
  CPC ............... *B65B 5/02* (2013.01); *B65B 5/04* (2013.01); *B65B 43/08* (2013.01); *B65B 57/12* (2013.01); *B65C 1/02* (2013.01)

(58) Field of Classification Search
  CPC .......... B65B 5/02; B65B 43/08; B65B 57/12; B65B 5/022; B65B 5/067; B65B 43/123; B65B 61/025; B65C 1/02
  See application file for complete search history.

(56) References Cited

U.S. PATENT DOCUMENTS

| | | | |
|---|---|---|---|
| 9,466,046 B1 * | 10/2016 | Theobald | G06Q 10/087 |
| 9,550,624 B2 * | 1/2017 | Khodl | B65G 1/1375 |
| 9,925,998 B2 * | 3/2018 | Ackerman | B65G 1/1375 |
| 10,384,870 B2 * | 8/2019 | Geiger | B65G 1/1375 |
| 11,267,653 B2 * | 3/2022 | Helsel | G05D 1/0297 |
| 2003/0046902 A1 * | 3/2003 | Cronauer | B65B 57/08 53/64 |
| 2009/0320413 A1 * | 12/2009 | Salm | B65B 13/20 53/460 |
| 2011/0283664 A1 * | 11/2011 | Thurgood | B65B 9/073 53/551 |
| 2014/0260121 A1 * | 9/2014 | Tokuda | B65B 51/26 53/548 |
| 2015/0353216 A1 * | 12/2015 | Siegel | B65B 51/10 53/427 |
| 2016/0009436 A1 * | 1/2016 | Basso | B65B 43/123 53/64 |
| 2017/0081067 A1 * | 3/2017 | Aze | B65C 3/06 |
| 2017/0129632 A1 * | 5/2017 | Williams | B65B 61/12 |
| 2018/0088586 A1 * | 3/2018 | Hance | G06Q 50/28 |
| 2019/0322451 A1 * | 10/2019 | Bastian, II | B65B 11/008 |
| 2019/0384280 A1 * | 12/2019 | Osawa | G05D 1/0287 |
| 2020/0031578 A1 * | 1/2020 | Lisso | B65G 1/0492 |
| 2020/0316786 A1 * | 10/2020 | Galluzzo | B25J 9/162 |
| 2021/0023866 A1 * | 1/2021 | Zhao | G05D 1/0088 |
| 2022/0084153 A1 * | 3/2022 | Johnson | G05D 1/0297 |

* cited by examiner

Primary Examiner — Joshua G Kotis

(57) ABSTRACT

A mobile packaging system and method to increase the efficiency of the picking and packaging process of items to be shipped from a warehouse or similar facility. A mobile packaging cart that is moved to a location adjacent to the storage location of the item to be packaged. The item to be packaged is retrieved from the storage location and identified, packaged, and the package is labeled at the location by the subsystems of the mobile packaging cart. The completed packages are stored on the mobile packaging cart until being unloaded for shipping from, or further processing within, the facility.

7 Claims, 12 Drawing Sheets

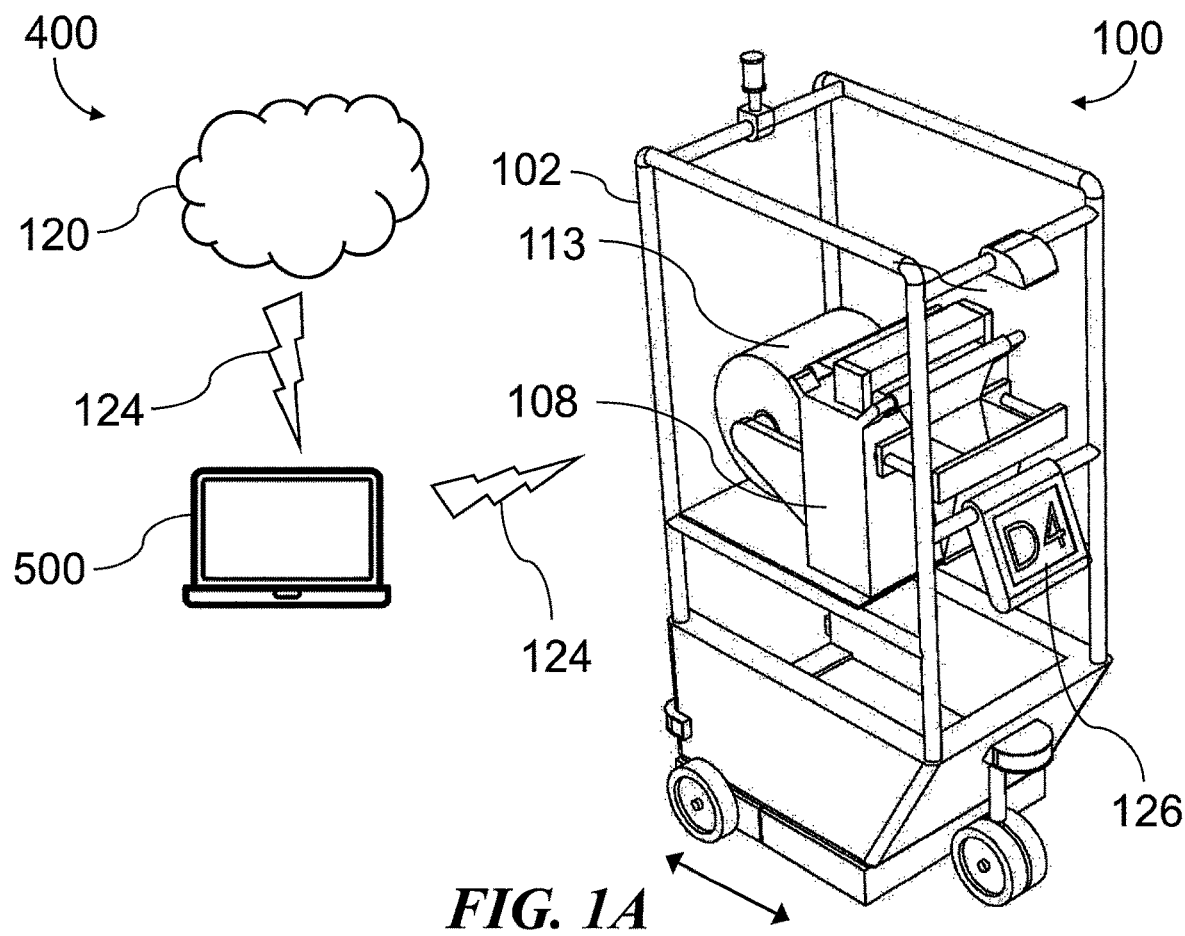
*FIG. 1A*
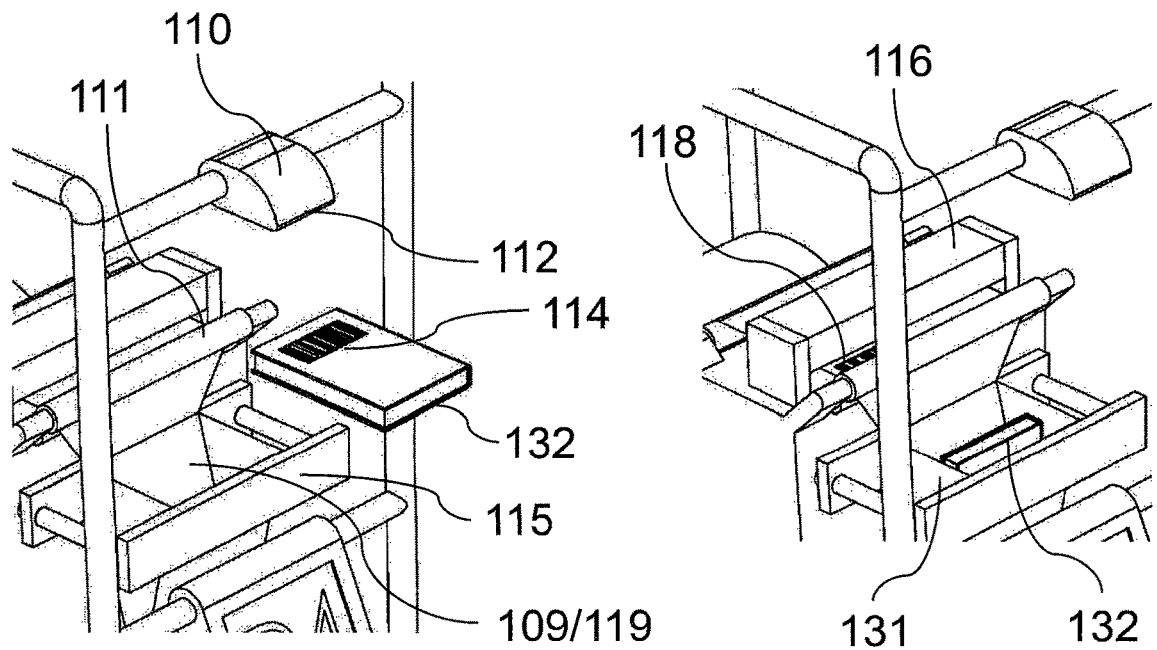
*FIG. 1B*  *FIG. 1C*

MOBILE PACKAGING SYSTEM AND METHOD

CROSS REFERENCE TO RELATED APPLICATION

This application claims the filing benefit under 35 U.S.C. § 119(e) of U.S. Provisional Application No. 63/113,600, filed Nov. 13, 1920, which is hereby incorporated by reference.

FIELD OF THE INVENTION

The present invention relates to a mobile packaging system to reduce the time, labor, and movement of items to be packaged. In particular, the present invention relates to a mobile packaging system that packages items adjacent to the location in which the items are stored.

BACKGROUND

Traditional warehouses and distribution centers store items on shelving throughout the facility. When an item is ordered or otherwise is required to be shipped out from the facility, that item is removed from the storage location and transported to a packaging location. To prepare for shipment at the packaging location, the item is placed into a shipping container, such as a shipping box or shipping mailer, and the shipping container is labeled such that it may be identified, such as a shipping label affixed to the outer surface of the shipping container.

Many facilities use human labor throughout the picking and packaging process. A human operator manually picks the items from the storage shelves, and the item is transported to the packaging location using carts, mobile shelving, conveyor systems, and the like. At the packaging location, the item is identified, such as a barcode of the item is read by a scanning device, and packaged. The inventory management system, warehouse management system, or the like, will create a link between the item and an identifier on the outer surface of the shipping container. Often the identifier is the actual shipping label containing the information of the intended destination of the package, such as the name and address of the recipient and other relevant details used by the shipping carrier. Other times the identifier is a barcode or similar which can then be read by a labeling system after the item has been packaged, such labeling system will then produce the required shipping label to be applied to the package.

Automation in warehouses and distribution facilities is often used to increase efficiency of the picking and packaging process. Automated or semi-automated packaging systems, such as box tapers and automated shipping pouch systems, can greatly reduce the labor required to prepare items for shipment. Intelligent warehouse management systems also group items to be packaged to optimize the labor, movement, and time required to manually pick items from the storage shelves.

Advanced automation systems using self-driving vehicles, such as autonomous mobile robots (AMR) or automated guided vehicles (AGV), have been used to further increase the efficiency of facilities. Examples of such systems include using an AMR to automate or semi-automate the picking process, such as by autonomously moving to the picking location and subsequently moving the picked items to the packaging location. Furthermore, the AMR may include a picking device to automate moving the desired item from the storage shelf to the temporary storage location on the AMR to transport the item to the packaging location. Although such systems add automation to the traditional pick and pack process, the items are still required to be picked at one location, and then moved to a separate location for packaging, before being ready for shipment. This typically means that human labor is required for at least a part of both the picking and packaging process, and the time and efficiency of moving an item throughout a facility from the storage location to a packaging location is not optimized.

There are examples of automated systems that further optimize the time, labor, and number of times an item is handled. Examples of such systems include automated warehouses in which the storage shelving units are moved to the packaging location using an AGV, such that the item is both picked and packaged at the packaging location. Such systems greatly increase efficiency of the process, however these systems can be extremely expensive and require a completely different infrastructure than traditional warehouses. As such, these systems are typically only viable for new warehouses that do not already have the infrastructure in place, such as the static shelving units used for storing items.

SUMMARY

There is a need for a system able to be installed in existing traditional warehouses that will allow a dramatic decrease in the labor, handling, movement, and time required to prepare an item for shipment. The present invention provides a solution for the use of a mobile packaging system that can be deployed at existing warehouses and distribution facilities worldwide. The system includes a mobile packaging cart which is moved adjacent to the storage location of an item to be packaged, and the item is picked from storage and packaged in a shipping container at that location. Once packaged within the shipping container, that item is ready for shipment or further processing within the facility. The shipping container containing the item is temporarily stored on the mobile packaging cart until the cart is moved to a location for unloading for shipping or additional processing.

In accordance with aspects of the invention, a mobile packaging system for packaging an item which is stored at a storage location includes a mobile packaging cart. The mobile packaging cart is adapted such that it can be easily moved throughout a facility to a location adjacent to the storage location of an item. The mobile packaging cart further includes a packaging subsystem and a labeling subsystem.

In accordance with embodiments of the present invention, the packaging subsystem is disposed to accept the item to produce a shipping container containing the item therein. The labeling subsystem is configured to label the shipping container with identification information correlated to the contents of the shipping container.

In accordance with embodiments of the present invention, the mobile packaging cart includes a mobile base. In aspects of the invention, the mobile packaging cart includes a powered drive unit to autonomously move the mobile packaging cart throughout a facility to a desired location adjacent to the storage location of an item.

In accordance with aspects of the invention, the packaging subsystem includes packaging material used to produce a shipping container. In aspects of the invention, the packaging subsystem includes a packaging material drive to move the packaging material through the packaging subsystem to create a shipping container having the item disposed therein. In aspects of the invention, the packaging subsystem includes a package sealer to substantially seal the packaging material of the shipping container such that the item is disposed therein.

In accordance with aspects of the invention, the labeling subsystem includes a printer configured to print identification information for the outside of the shipping container. In aspects of the inventions, the labeling subsystem includes a label applicator to affix a label containing identification information to the outside of the shipping container.

In accordance with aspects of the invention, shipping containers including the item therein produced by the packaging subsystem are stored in a completed package storage location of the mobile packaging cart.

In accordance with aspects of the invention, the mobile packaging cart includes a temporary storage location used to temporarily store an item prior to moving the item to the packaging subsystem.

In accordance with aspects of the invention, the system includes a mobile storage cart used to store a supplemental item. The mobile storage cart containing the supplemental item is positionable adjacent to the mobile packaging cart such that the supplemental item can be transferred to the packaging subsystem of the mobile packaging cart.

In accordance with aspects of the invention, a mobile packaging system for packaging an item which is stored at a storage location includes a mobile packaging cart, which includes a packaging subsystem, a labeling subsystem, and a completed package storage location. The mobile packaging cart is adapted such that it can be easily moved throughout a facility to a location adjacent to the storage location of an item. The packaging subsystem is disposed to accept the item to produce a shipping container containing the item therein. The labeling subsystem is configured to label the shipping container with identification information correlated to the contents of the shipping container. The completed package storage location is configured to store the shipping containers on the mobile storage cart.

In accordance with an embodiment, a mobile packaging system for packaging an item which is stored at a storage location, includes (1) a mobile packaging cart positionable adjacent the storage location, (2) a packaging subsystem disposed on the mobile packaging cart, and (3) a labeling subsystem disposed on the mobile packaging cart.

In accordance with another embodiment, the packaging subsystem is configured to produce a shipping container having the item disposed therein.

In accordance with another embodiment, the labeling subsystem is configured to label the shipping container.

In accordance with another embodiment, the mobile packaging cart has a mobile base.

In accordance with another embodiment, the mobile packaging cart is configured to autonomously move adjacent the storage location.

In accordance with another embodiment, the packaging subsystem includes packaging material.

In accordance with another embodiment, the packaging subsystem includes a packaging material drive.

In accordance with another embodiment, the packaging subsystem includes a package sealer.

In accordance with another embodiment, the labeling subsystem includes a printer.

In accordance with another embodiment, the labeling subsystem includes a label applicator.

In accordance with another embodiment, the packaging subsystem is configured to produce a shipping container having the item disposed therein, and the mobile packaging cart has a completed package storage location configured to store the shipping container.

In accordance with another embodiment, temporary storage is disposed on the mobile packaging cart.

In accordance with another embodiment, the mobile packaging system is configured to package a supplemental item. A mobile storage cart containing the supplemental item is positionable adjacent the mobile packaging cart. The mobile storage cart is configured to transfer the supplemental item to the packaging subsystem.

Other embodiments, in addition to the embodiments enumerated above, will become apparent from the following detailed description, taken in conjunction with the accompanying drawings, which illustrate, by way of example, the principles of the mobile packaging system and method.

BRIEF DESCRIPTION OF THE FIGURES

FIG. 1A is a diagrammatic illustration of a mobile packaging system, according to embodiments of the present invention;

FIG. 1B is a partial isometric view of the identification subsystem and packaging subsystem of a mobile packaging system;

FIG. 1C is a partial isometric view of the labeling subsystem and packaging subsystem of a mobile packaging system;

DETAILED DESCRIPTION

Figure 2:
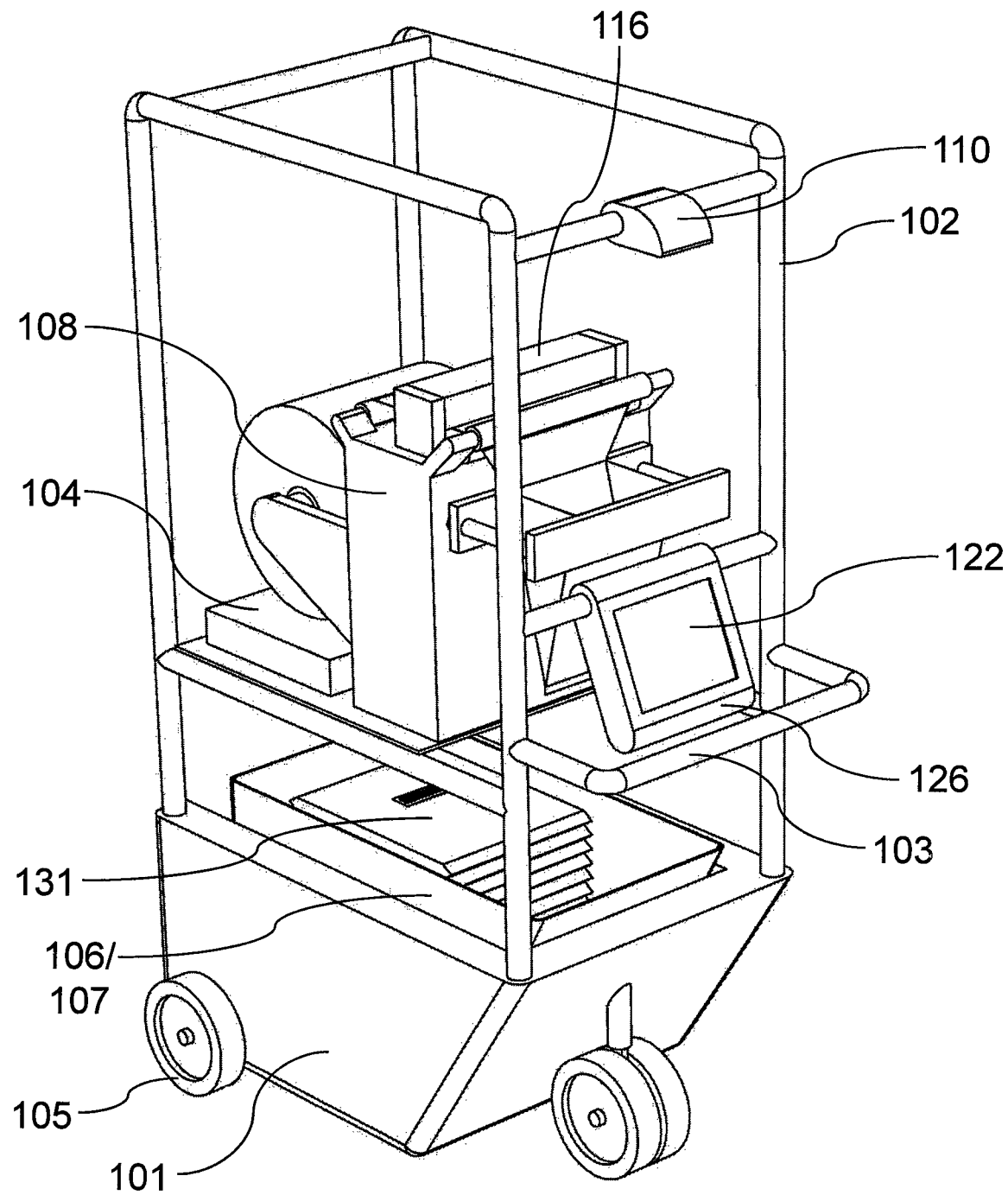
FIG. 2 is an isometric view of a mobile packaging cart that is moved adjacent to the storage location of an item.

An illustrative embodiment of the present invention relates to a mobile packaging system containing at least one mobile packaging cart that is moved and positioned adjacent to the storage location of the item to be packaged. A mobile packaging system improves efficiency of picking and packaging processes. The mobile packaging cart is moved and positioned adjacent to the storage location of the item to be packaged such that the picking and packaging process occurs at a single location by a single human operator. The mobile packaging system can use multiple mobile packaging carts such that multiple items may be picked and packaged simultaneously. The mobile packaging system automates such processes as the movement of the mobile packaging cart, the picking of the item, and the packaging of the item. The mobile packaging system can contain mobile packaging carts containing various packaging systems, as well as various configurations of temporary storage shelves. The mobile packaging system provides an efficient alternative to traditional warehouse processes by reducing labor and optimizing distance travelled by items to be packaged. The mobile packaging system can be used in conjunction with other warehouse automation systems such that only a portion of the autonomous vehicles are mobile packaging carts.

FIGS. 1A through 12, wherein like parts are designated by like reference numerals throughout, illustrate an example embodiment or embodiments of a mobile packaging system, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment or embodiments disclosed, such as the size, shape, or type of elements or materials, in a manner still in keeping with the spirit and scope of the present invention.

FIG. 1A shows a diagrammatic illustration of a mobile packaging system 100 in accordance with embodiments of the present invention. The example mobile packaging system 100 depicted in the figures uses an item 132 (refer to FIG. 1B) to be packaged for the description and figures merely for the purposes of teaching how the invention can be specifically implemented. However, one of skill in the art will appreciate that other items 132 (refer to FIG. 1B) can be packaged by the mobile packaging system 100 described herein by modification to some of the components for the particular size and shape of the item 132 (refer to FIG. 1B), such that the present invention is intended to be universally applicable to a variety of items 132 (refer to FIG. 1B) to be packaged and is not limited to the specific item 132 (refer to FIG. 1B) shown and described. For the avoidance of doubt, references to item 132 (refer to FIG. 1B) include but are not limited to books, toys, electronics, clothing, footwear, dry goods, catalogs, brochures, paperwork, packaged food and beverages, household items, personal care items, cosmetics, tools, hardware, pet supplies, consumer goods, mechanical parts, or any other item which can be packaged and shipped.

The example mobile packaging system 100 can contain a mobile packaging cart 102 that is moved adjacent to the storage location 146 (refer to FIG. 6) of an item 132 (refer to FIG. 1B) such that the mobile packaging cart 102 is positioned in close proximity to the storage location 146 (refer to FIG. 6) to enable quick and convenient transfer of the item 132 (refer to FIG. 1B) from the storage location 146 (refer to FIG. 6) to the mobile packaging cart 102. As shown in FIGS. 1B through 1C, the item 132 is removed from the storage location 146 (refer to FIG. 6) by a human operator and an item identifier 114 is read by a reader 112 of an identification subsystem 110 such that the computing device 500 (refer to FIG. 1A) of the mobile packaging system 100 (refer to FIG. 1A) confirms the correct item 132 has been retrieved from the storage location 146 (refer to FIG. 6). The correct item 132 is then moved by the human operator to the loading location 109 of the packaging subsystem 108 such that the item 132 may be processed by the packaging subsystem 108 to dispose the item 132 within a shipping container 131. A labeling subsystem 116 prints a unique shipping container label 118, such as a shipping label for the item 132 contained within the shipping container 131, directly on or to be applied to the outer surface of the shipping container 131. Alternatively, the labeling subsystem 116 may read a unique shipping container label 118 that is preprinted or preapplied to the packaging material 113 (refer to FIG. 1A) such that a computing device 500 (refer to FIG. 1A) of the mobile packaging system 100 (refer to FIG. 1A) establishes a link between the shipping container label 118 and the contents of the shipping container 131 that was created using the labeled packaging material 113 (refer to FIG. 1A). Both (1) the actual printing and application of a label, and (2) the reading of a preprinted or preapplied label are considered herein as constituting labeling the shipping container.

Referring to FIGS. 1A through 1C, the computing device 500 of the mobile packaging system 100 is a portion of a communication network 124 that enables communication between a data store 120 containing information regarding items 132 to package, such as the storage location 146 (refer to FIG. 6), item identifier 114, required packaging subsystem 108 to be used, data to read or create a shipping container label 118, and the like. The data store 120 is a part of or in communication with a warehouse management system 400 or similar organizational system understood by those of skill in the art. For the purposes of mobility of the mobile packaging cart 102, the communication between the computing device 500 and mobile cart controller 126 can be a wireless communication network, although for the purposes of this invention it is understood by those of skill in the art that the communication network 124 can be a local area network, a wide area network, wired, wireless, cloud-based, or any other network or combination of networks or data sharing constructs. Additionally, the communication between the mobile cart controller 126 and the devices and subsystems of the mobile packaging cart 102 can be a wired or wireless communication network as previously listed. Those of skill in the art will additionally appreciate that the location of each system and subsystem as depicted and described herein can vary such that the system or subsystem may be moved, combined, integrated, separated, or a combination of such and still perform the stated functionality, all of which are anticipated to fall within the scope of the present invention. The specific devices and arrangements described herein are merely representative of one example implementation of the inventive system and method and are therefore not intended to be limiting.

The subsystems illustrated are example embodiments of devices known by those of skill in the art for the purposes of achieving the desired functions of the mobile packaging system 100. The identification subsystem 110 contains a reader 112 that can detect optical item identifiers 114 of the item 132, such as a barcode, quick response (QR) code, or text or object recognition, or transmission protocol item identifiers 114 such as a near-field communication (NFC) chip, a radio-frequency identification (RFID) tag, and the like, as would be appreciated by those of skill in the art.

The packaging subsystem 108 illustrated in the FIGS. 1A through 1C displays an example of a semi-automated bagging system using packaging material 113 comprised of flexible plastic film containing pre-cut bag openings 119. A packaging material drive 111 of the packaging subsystem 108 uses a drive wheel to feed the packaging material 113 through the packaging subsystem 108 to a known location such that the precut bag opening 119 allows easy insertion of the item 132 into the loading location 109 of the packaging subsystem 108. After one or more items 132 are placed into the loading location 109, the package sealer 115 is closed to dispose the one or more items 132 within the packaging material 113 and the packaging material 113 is sealed together using heat to create a shipping container 131. The shipping container 131 is separated from the remaining packaging material 113 by the heat of the seal or other common method such that the shipping container 131 drops to a completed package storage location 106 (refer to FIG. 2) of the mobile packaging cart 102.

The exemplary embodiment described herein is one type of packaging subsystem 108 using a particular packaging material 113, packaging material drive 111, and package sealer 115 to create a shipping container 131. It should be recognized by one of skill in the art that various other known packaging systems (including but not limited to bagging systems, form fill and seal systems, polybag mailer systems, dual web mailer systems, cartoning systems, right-size boxing systems, shrink wrappers, automated mailing systems, and the like) can be used with other common types of packaging material 113 (including but not limited to various plastic films, paper, cardboard, corrugated cardboard, shrink films, padded mailers, bubble wrap material, fabric, and the like), other known packaging material drives 111 (including but not limited to electrical, pneumatic, or hydraulic rotary or stop motion feed systems and the like), and other known package sealers 115 (including but not limited to adhesive tape, water activated tape, glue or other adhesives, self-adhesive strips, ultrasonic welding, stitching, embossing, tab in slot engagement, and the like) to create the corresponding shipping container 131 (including but not limited to boxes, pouches, bags, envelopes, padded envelopes, mailers, padded mailers, and the like) in keeping with the spirit and scope of the invention.

In an embodiment of the present invention, the labeling subsystem 116 is a printer such that the labeling subsystem 116 can print a shipping container label 118 directly on the packaging material 113 of the shipping container 131. Such shipping container label 118 can be a shipping label containing shipping carrier information, such as the destination of the shipping container 131, such that the shipping container 131 is ready to ship and requires no additional processing within the warehouse. In another embodiment, the shipping container label 118 is an optical identifier, such as a barcode, which will allow additional systems in the warehouse to identify the shipping container 131 for further processing, such as a system to weigh the shipping container 131 and create and apply a shipping label for the shipping container 131. In yet an additional embodiment, the labeling subsystem 116 contains a reader to identify a shipping container label 118 that is preprinted on or pre-applied to the packaging material 113 of the shipping container 131, such as an optical identifier or transmission protocol identifier as previously described, to allow additional systems to identify and further process the shipping container 131 as previously described. In an additional embodiment, the labeling subsystem 116 is a label applicator that applies a label on to the shipping container 131 for additional processing or shipping as previously described. The label applicator can be an automated applicator which applies preprinted labels, a combination label printer and automated applicator, a label printer producing labels to be manually applied to the shipping container 131, or a label dispenser to dispense a preprinted label to be manually applied to the shipping container 131, as would be appreciated by one of skill in the art. In another embodiment, the labeling subsystem 116 includes the additional functionality, or an additional printer, capable of printing other information required for processing, such as a packing slip to be inserted in to the shipping container 131. Various other means of labeling the shipping container 131, such as tagging with a visual identification tag or a transmission protocol identifier such as a near-field communication (NFC) chip, or a radio-frequency identification (RFID) tag, and the like may be used as the labeling subsystem 116 as would be appreciated by one of skill in the art.

FIG. 2 shows a mobile packaging cart 102 that can contain a number of subsystems. Various configurations of subsystems, such as the location of the subsystems or separation of subsystems to multiple mobile packaging carts 102 can be implemented keeping with the spirit and scope of the present invention. In accordance with one illustrative embodiment, the mobile packaging cart 102 includes a mobile cart controller 126, a packaging subsystem 108, an identification subsystem 110, a labeling subsystem 116, and a completed package storage location 106. In an embodiment of the present invention, the completed package storage location 106 includes a removable storage tote 107 such that the labeled shipping containers 131 can be quickly unloaded from the mobile packaging cart 102. The mobile packaging cart 102 depicted also includes a battery 104 to provide electrical power to the included systems and subsystems of the mobile packaging cart 102 such that the mobile packaging cart 102 is not tethered to traditional power outlets by an electrical power cord. The battery 104 of the mobile packaging cart 102 can power all systems and subsystems of the mobile packaging cart 102, or some or all systems and subsystems can have a dedicated battery 104 for that particular system or subsystem. The mobile packaging cart 102 is sized, dimensioned, and configured to accommodate the aforementioned systems while also remaining maneuverable within the space in which the system is intended to operate, such as generally about 2 feet wide, 3 feet long, and 5 feet tall. Those of skill in the art will appreciate that these dimensions are intended to describe the general size and shape the mobile packaging cart 102, and the size and shape may be altered to accommodate larger or smaller systems, such as a larger packaging subsystem 108 capable of packaging larger or multiple objects, and still remain within the scope of the present invention.

The mobile packaging cart 102 includes a mobile base 101 including wheels 105 such that the mobile packaging cart 102 can be moved, maneuvered, and positioned to a desired location. In additional embodiments, other known alternatives to wheels 105, such as spheres, skids, sleds, tank treads (continuous track), hovercraft, magnetic levitation, and the like may be used to allow mobility of the mobile base 101 in keeping with the spirit and scope of the invention. A handle 103 of the mobile packaging cart 102 enables the manual movement of the mobile packaging cart 102 by the human operator. The display 122 of the system can show information relevant to where the system is to be moved, such as a map, turn-by-turn instructions, aisle number, storage bay number, or the like. In accordance with an embodiment of the present invention, the display 122 is integral or mounted to the mobile packaging cart 102. In yet another embodiment, the display 122 is worn or held by the human operator of the system. In yet another embodiment, the operator receives the information in audio form in place of or in combination with a display 122.

Figure 3:
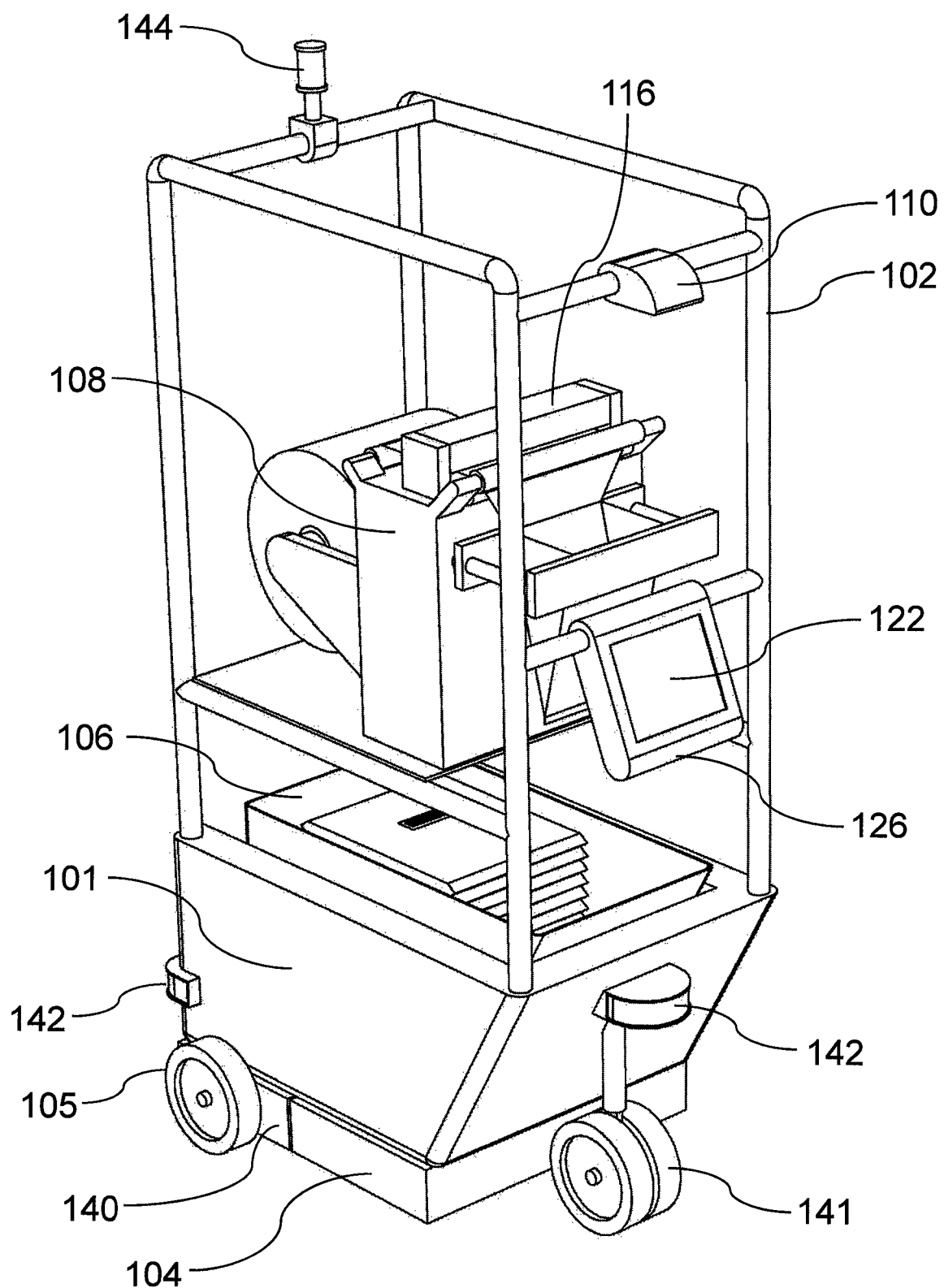
FIG. 3 is an isometric view of a mobile packaging cart that is autonomously moved adjacent to the storage location of an item.

FIG. 3 illustrates an embodiment of a mobile packaging cart 102 that can move autonomously along a desired path or to a desired location. The mobile base 101 includes a powered drive unit 140 in communication with the mobile cart controller 126 can propel the mobile packaging cart 102. Varying the drive speed of the wheels 105 of the drive unit 140 of the mobile base 101 can steer and maneuver the mobile packaging cart 102 along a desired path. In another embodiment, in conjunction with a drive unit 140, the mobile base 101 includes a powered steering system 141 in communication with the mobile cart controller 126 can steer and maneuver the mobile packaging cart 102 as desired. In an example embodiment, an indoor positioning system 144, such as Bluetooth Low-Energy (BLE), Wi-Fi, and the like, is used to track the position and direct the movement of the mobile packaging cart 102. In further embodiments, additional safety devices such as obstruction detection sensors 142 are used to detect unexpected objects or people in the intended path of movement such that the mobile cart controller 126 can stop movement of the mobile packaging cart 102 until the obstruction has cleared or can direct the mobile packaging cart 102 along an alternate path. In additional embodiments, various methods for moving and guiding automated guided vehicles (AGVs), such as following fixed path markers, or autonomous mobile robots (AMRs), such as independently creating paths based on digital mapping of the space in which the system is used, are utilized as appreciated by one of skill in the art. Also included on the mobile packaging cart 102 are a battery 104, a display 122, an identification subsystem 110, a packaging subsystem 108, a labeling subsystem 116, and a completed package storage location 106.

Figure 4:
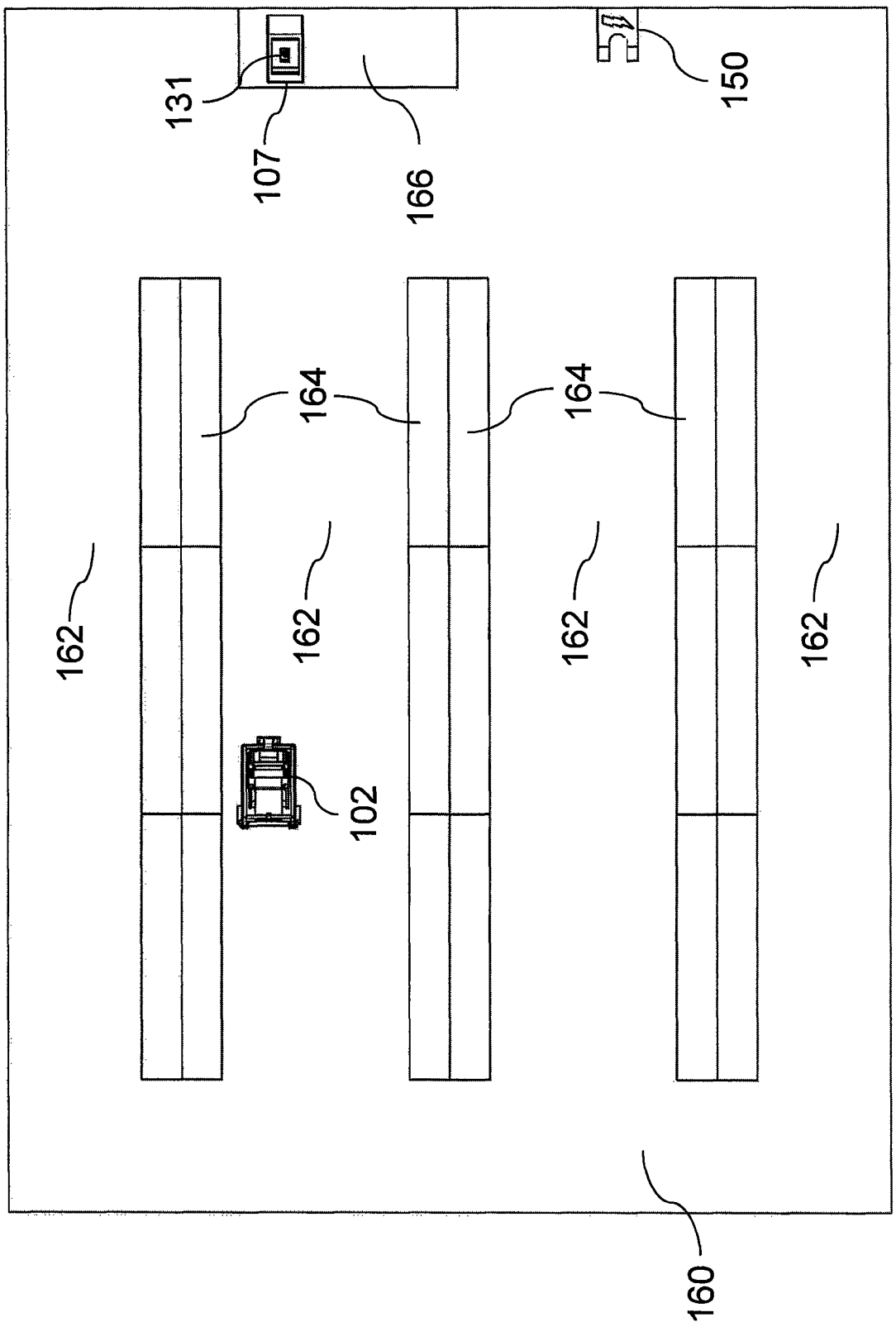
FIG. 4 is a top plan view of a warehouse floor utilizing a mobile packaging system.

FIG. 4 is a top plan view which shows an example of a mobile packaging cart 102 used in a typical warehouse storage area 160. The mobile packaging cart 102 moves within the transportation aisles 162 located between the storage shelving 164 of the warehouse storage area 160 to reach a destination adjacent to the storage location 146 (refer to FIG. 6) of an item 132 (refer to FIG. 6), at which point the item 132 (refer to FIG. 6) is moved from the storage location 146 (refer to FIG. 6) and is packaged by the systems of the mobile packaging cart 102. The mobile packaging cart 102 can then be moved to a subsequent location as directed by the mobile packaging system 100 (refer to FIG. 1) to package additional items 132 (refer to FIG. 6), or can be routed to an unloading station 166 such that shipping containers 131 may be unloaded from the completed package storage location 106 (refer to FIG. 2) of the mobile packaging cart 102, such as by removing the removable storage tote 107 from the mobile packaging cart 102. When desired or required, the mobile packaging cart 102 can be routed and docked to a charging station 150 to charge the onboard battery 104 (refer to FIG. 3). In additional embodiments of the system, the battery 104 (refer to FIG. 3) can be removed from the mobile packaging cart 102 to be charged, such that the depleted battery 104 is replaced by a charged battery 104 in order to keep the mobile packaging cart 102 in use while the depleted battery 104 is being charged. In summary, in a warehouse storage area having a plurality of storage locations 146, mobile packaging cart 102 can be positioned adjacent to each of the plurality of storage locations 146.

Figure 5:
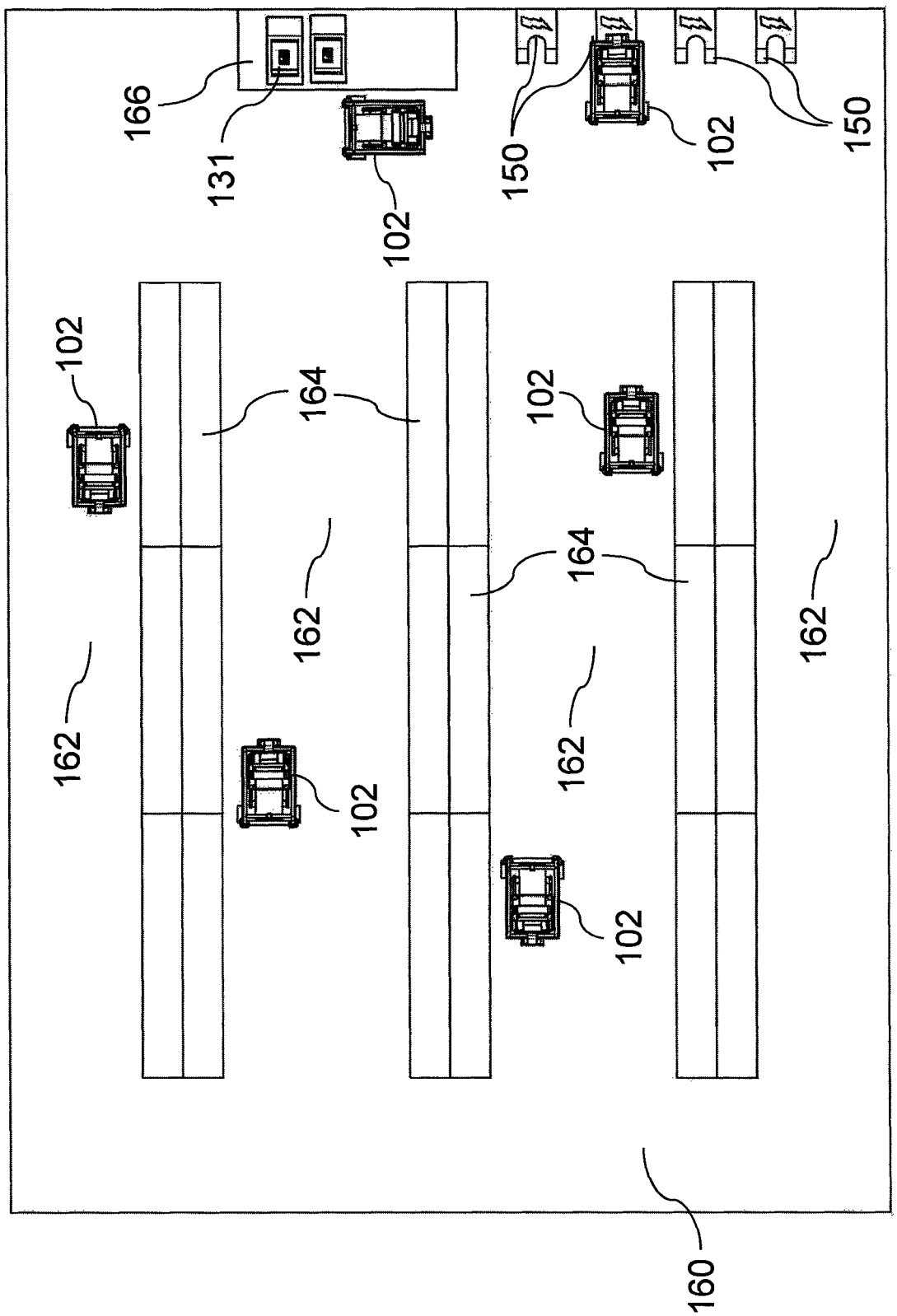
FIG. 5 is a top plan view of a warehouse floor utilizing a mobile packaging system containing multiple mobile packaging carts.
Figure 8:
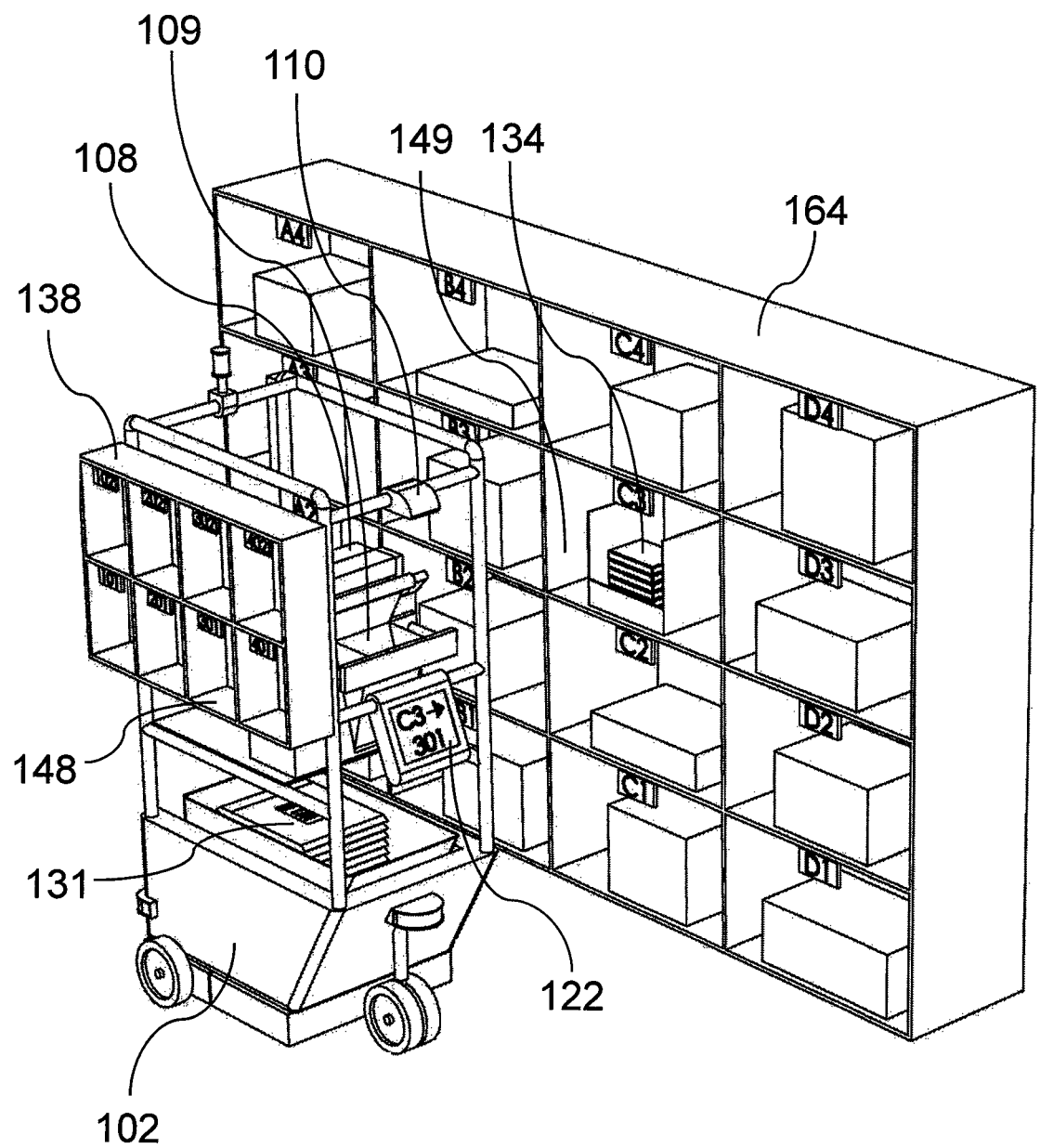
FIG. 8 is an isometric view of a mobile packaging cart with temporary storage positioned adjacent to the storage location of an item.
Figure 9A:
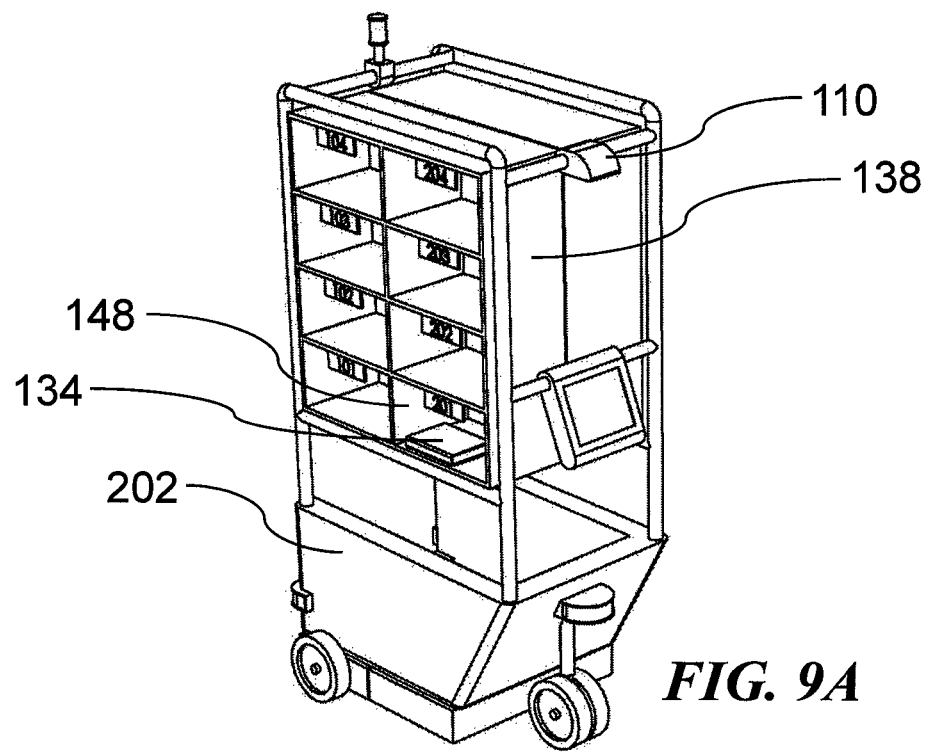
FIG. 9A is an isometric view of a mobile storage cart that is moved adjacent to the storage location of a supplemental item.
Figure 9B:
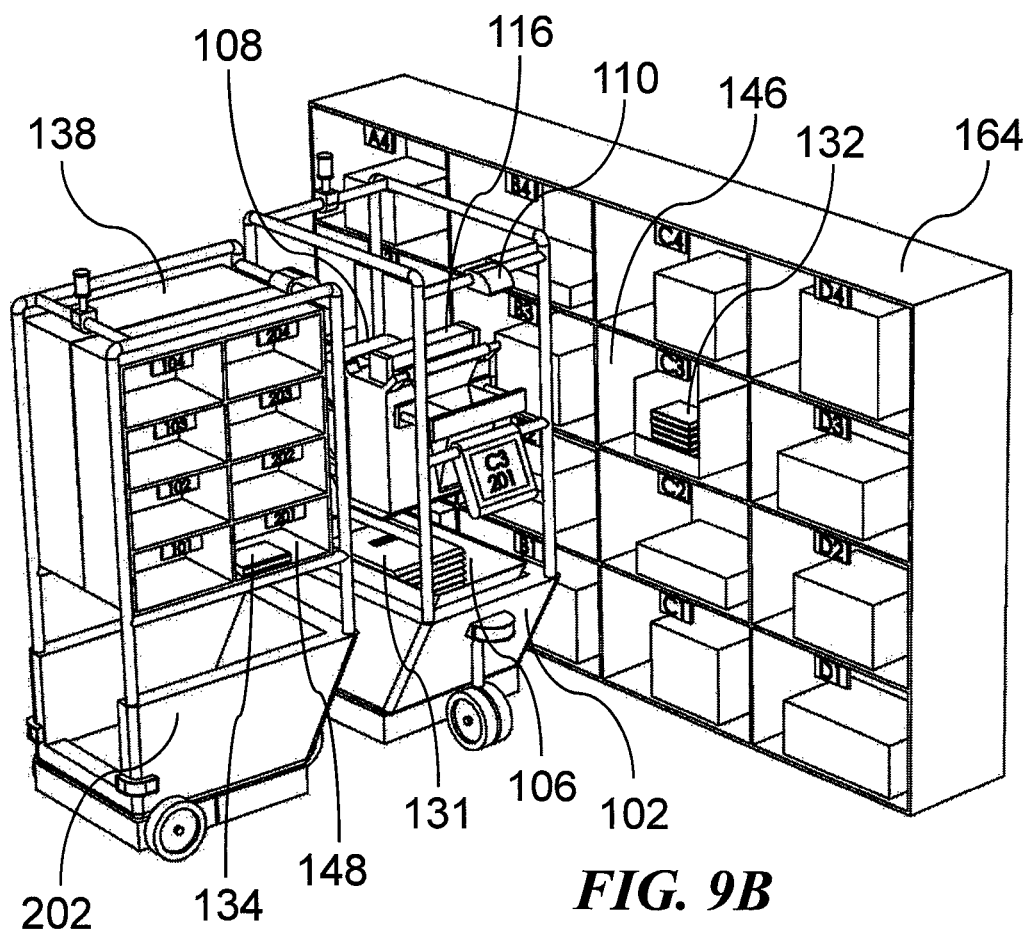
FIG. 9B is an isometric view of a mobile packaging cart positioned adjacent to both the storage location of the item to be packaged, as well as to a mobile storage cart containing a supplemental item to be packaged.

FIG. 5 is a top plan view which shows an example of multiple mobile packaging carts 102 used together in a typical warehouse storage area 160 comprised of transportation aisles 162 located between the storage shelving 164. The multiple mobile packaging carts 102 function as previously described such that the output capacity of the mobile packaging system 100 (refer to FIG. 1A) is increased by each additional mobile packaging cart 102. Also shown are multiple charging stations 150 and an unloading station 166 for unloading shipping containers 131 from the completed package storage location 106 (refer to FIG. 2) of the mobile packaging carts 102. In an example embodiment, the multiple mobile packaging carts 102 are identical such that each mobile packaging cart 102 is intended for the exact same function. In a further embodiment, some or all of the mobile packaging carts 102 may be of a different size or shape, or include different subsystems, such as an alternate packaging subsystem 108, such that certain mobile packaging carts 102 are intended for particular functions or to package particular items. Additional features or subsystems may be added to the mobile packaging cart 102, such as temporary storage 138 (refer to FIG. 8), or features or subsystems omitted to create a mobile storage cart 202 (refer to FIG. 9A) to increase functionality of the mobile packaging system 100 (refer to FIG. 1A) as illustrated in FIGS. 8 through 9B. In additional embodiments, the present invention of a mobile packaging system 100 (refer to FIG. 1A) can be used as a part of or in conjunction with other known manual and automated warehouse picking systems.

FIG. 4 and FIG. 5 illustrate examples of the use of the mobile packaging carts 102 within a simple warehouse storage area 160. It should be apparent to one of skill in the art that the present invention can be used in any warehouse layout, as well as other environments where it would be beneficial to package items 132 (refer to FIG. 6) adjacent to the storage location 146 (refer to FIG. 6) of the item 132 (refer to FIG. 6), such as distribution centers, storage rooms, and traditional brick and mortar stores. In further embodiments of the present invention, other common means of storage, such as racks, pallets, boxes, cubbies, drawers, cabinets, dispensers, totes, lockers, hooks, hangers, and the like can be used in place of or in combination with traditional warehouse storage shelving 164 in the warehouse storage area 160.

Figure 6:
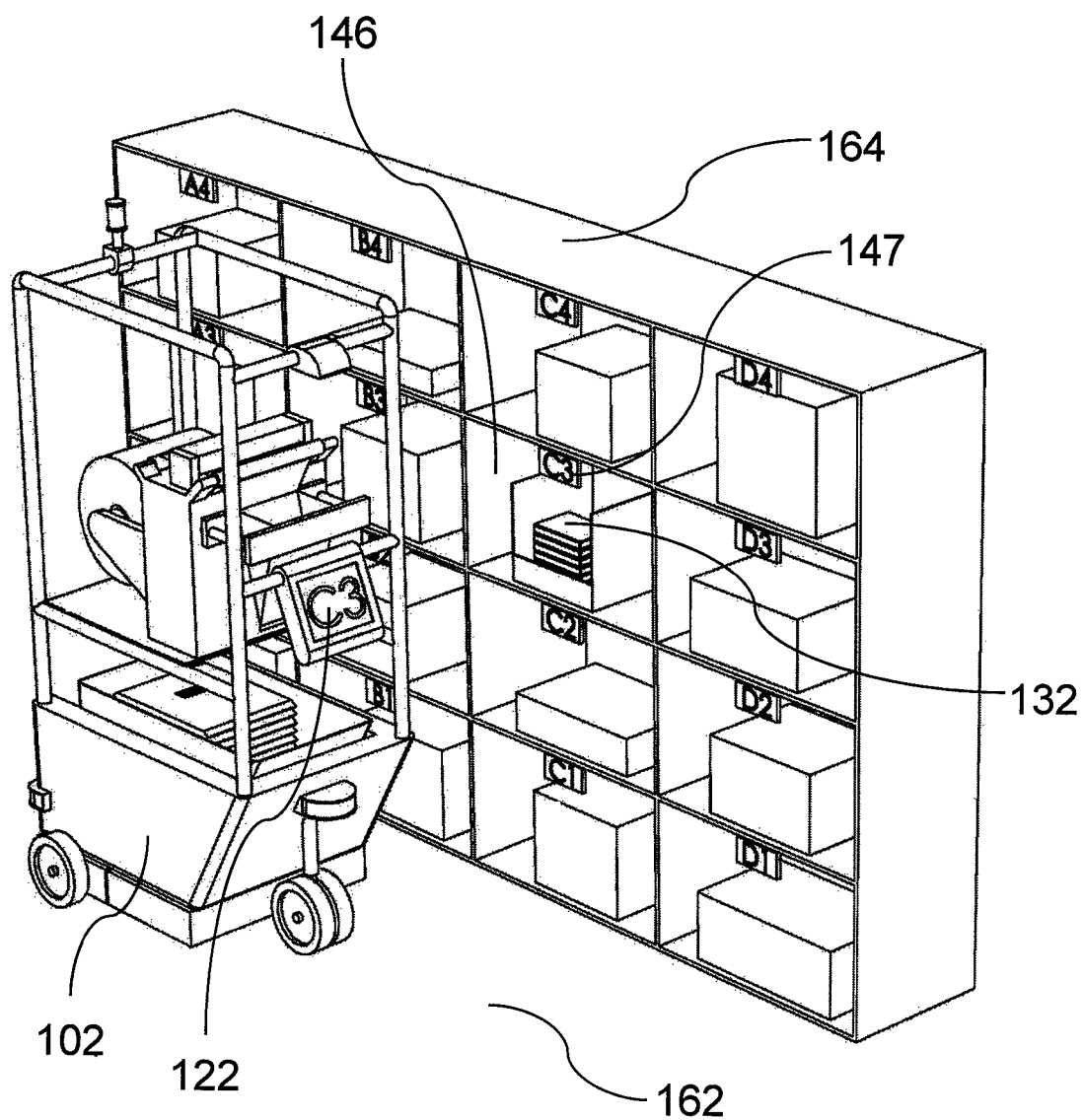
FIG. 6 is an isometric view of a mobile packaging cart positioned adjacent to the storage location of an item.

FIG. 6 illustrates the mobile packaging cart 102 that has been moved and maneuvered within the transportation aisles 162 to the desired destination adjacent to the storage location 146 on the storage shelving 164 of the item 132. In an embodiment of the present invention, the display 122 of the mobile packaging cart 102 can indicate information to enable a human operator to identify and retrieve the intended item 132, such as the storage bay identifier 147, picture of the item 132, description of the item 132, barcode information of the item 132, and the like. In additional embodiments, alternate picking systems used in warehouses, such as "pick to light" or "pick to voice" systems, can be used in place of or in combination with the previously mentioned item identification methods.

Figure 7:
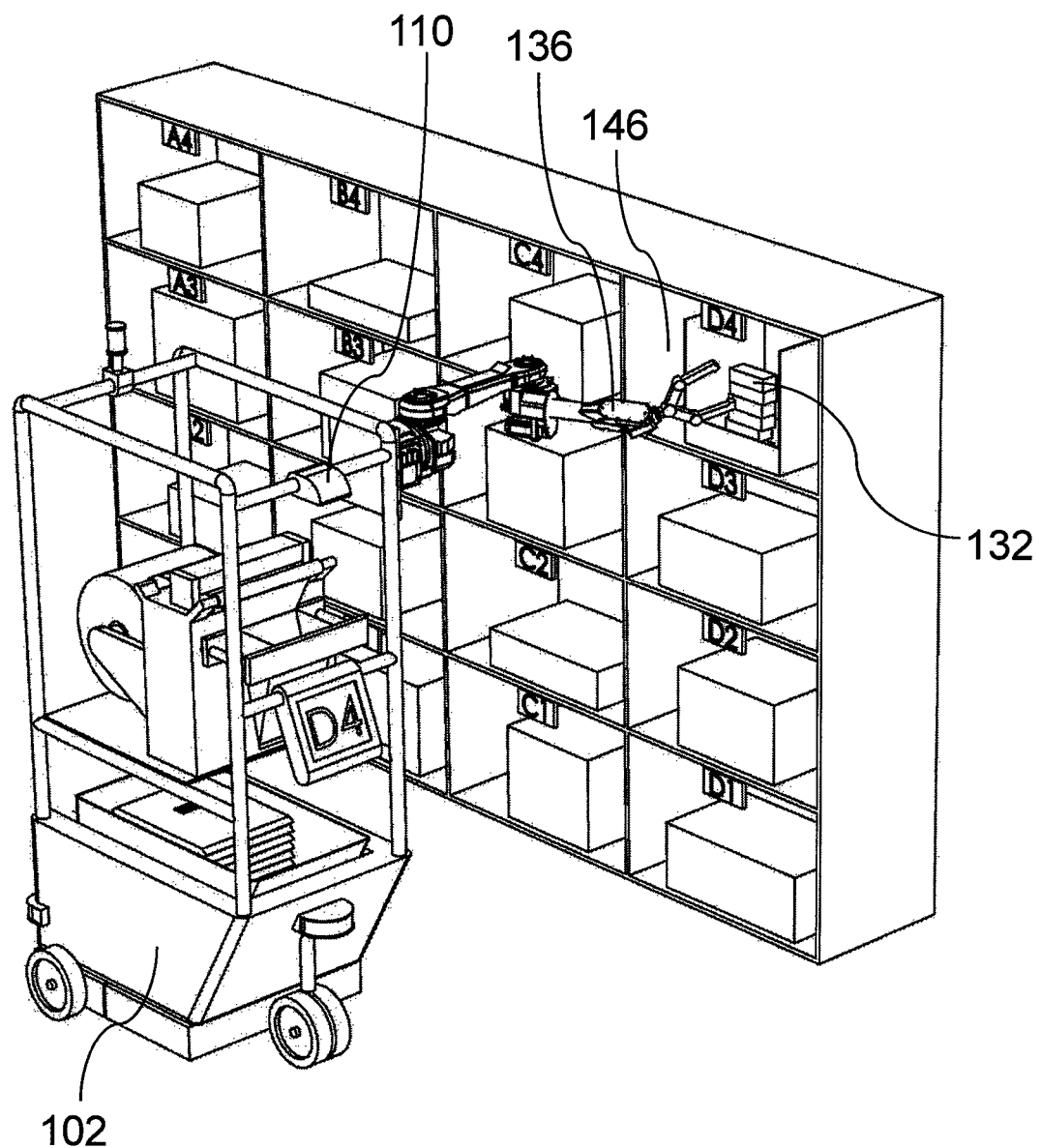
FIG. 7 is an isometric view of a mobile packaging cart with an autonomous picking device positioned adjacent to the storage location of an item.

FIG. 7 illustrates the mobile packaging cart 102 as shown in FIG. 6 with the addition of an autonomous picking device 136, such as a robotic arm and the like, to further automate the processes of the mobile packaging system 100 (refer to FIG. 1A). The autonomous picking device 136 can retrieve the item 132 from the storage location 146 and move the item 132 to be identified and packaged by the systems of the mobile packaging cart 102 as previously described. The autonomous picking device 136 can use the identification subsystem 110 of the mobile packaging cart 102 to detect the position of the correct item 132. Alternatively, the autonomous picking device 136 can include a vision and detection system such that the autonomous picking device 136 can identify and retrieve the item 132.

FIG. 8 illustrates the mobile packaging cart 102 as shown in FIG. 6 with the addition of temporary storage 138. In an embodiment of the system, when a supplemental item 134 is to be packaged within the same shipping container 131 as another item 132 (refer to FIG. 6), the mobile packaging cart 102 can first be moved adjacent to a second storage location 149. The second storage location 149 is the storage location of the supplemental item 134 to be packaged within the same shipping container 131 as another item 132 (refer to FIG. 6). The supplemental item 134 can be any of such previously described examples of an item 132 (refer to FIG. 1B). The supplemental item 134 is moved from the second storage location 149 of the warehouse storage shelving 164, read by the identification subsystem 110, and placed into a designated temporary storage location 148 of the temporary storage 138. The designated temporary storage location 148 may be indicated by information on the display 122, a visual indicator such as a light at the temporary storage location 148, or some other means appreciated by those of skill in the art. Once the supplemental item 134 has been stored in the temporary storage location 148, the mobile packaging cart 102 can then move to a next location as determined by the mobile packaging system 100 (refer to FIG. 1A). When the mobile packaging cart 102 arrives at the storage location 146 (refer to FIG. 6) of the item 132 (refer to FIG. 6) which is to be combined with the one or more supplemental items 134 stored in temporary storage 138 of the mobile packaging cart 102, the item 132 (refer to FIG. 6) is retrieved from the storage location 146 (refer to FIG. 6) and read by the identification subsystem 110 and moved to the loading location 109 of the packaging subsystem 108 as previously described. While at the same location, the one or more supplemental items 134 are retrieved from the temporary storage location 148 and read by the identification subsystem 110 and then combined with the previously mentioned item 132 (refer to FIG. 6) in the loading location 109 of the packaging subsystem 108 such that the item 132 (refer to FIG. 6) and supplemental item(s) 134 are packaged together within a single shipping container 131. The item 132 (refer to FIG. 6) and supplemental item(s) 134 to be packaged together may be picked in a row, or other items 132 (refer to FIG. 6) can be picked and packaged or other supplemental items 134 can be picked and temporarily stored in between the item 132 (refer to FIG. 6) and supplemental item(s) 134 to be packaged together in order to optimize efficiency of the movement of the mobile packaging cart 102 within the warehouse storage area 160 (refer to FIG. 5). In another embodiment, for instances that the supplemental item(s) 134 and the item 132 (refer to FIG. 6) are picked in succession, the supplemental item(s) 134 can be stored in the loading location 109 of the packaging subsystem 108 instead of the temporary storage 138 as previously described. Once the final item 132 (refer to FIG. 6) to be included in the same shipping container 131 has been moved to the loading location 109 as previously described, the shipping container 131 containing the item 132 (refer to FIG. 6) and supplemental item(s) 134 is seal closed as previously described.

FIG. 9A through 9B illustrate a mobile storage cart 202 of the mobile packaging system 100 (refer to FIG. 1A) used in conjunction with mobile packaging carts 102. The mobile storage cart 202 includes temporary storage 138 as previously described, but does not contain features required for packaging and storage of shipping containers 131, such as a packaging subsystem 108, labeling subsystem 116, and completed package storage location 106 as are included on a mobile packaging cart 102. As illustrated in FIG. 9A, a supplemental item 134 is moved from the second storage location 149 (refer to FIG. 8), read by the identification subsystem 110, and placed into a designated temporary storage location 148 of the temporary storage 138. To combine supplemental item(s) 134 with another item 132 into a single shipping container 131, the mobile storage cart 202 moves to the location in which a mobile packaging cart 102 has or is ready to accept the item 132 from the storage location 146 of the storage shelving 164 as illustrated in FIG. 9B. The one or more supplemental items 134 are retrieved from the temporary storage location 148 of the mobile storage cart 202 and read by the identification subsystem 110 of the mobile packaging cart 102 and combined with the previously mentioned item 132 as previously described for FIG. 8. It should be apparent to one of skill in the art that a mobile packaging cart 102 including temporary storage 138 may be used in place of a mobile storage cart 202 as described in FIGS. 9A through 9B in keeping with the spirit and scope of the invention.

The temporary storage 138 shown in FIGS. 8 through 9B illustrate an example of a means of creating a temporary storage location 148 for a supplemental item 134 to be picked and then packaged at a later time. Alternate methods of temporary storage 138 on the mobile packaging cart 102 or mobile storage cart 202, such as boxes, lockers, cubbies, drawers, cabinets, dispensers, totes, hooks, hangers, and the like are also practicable within the scope of the present invention.

Figure 10:
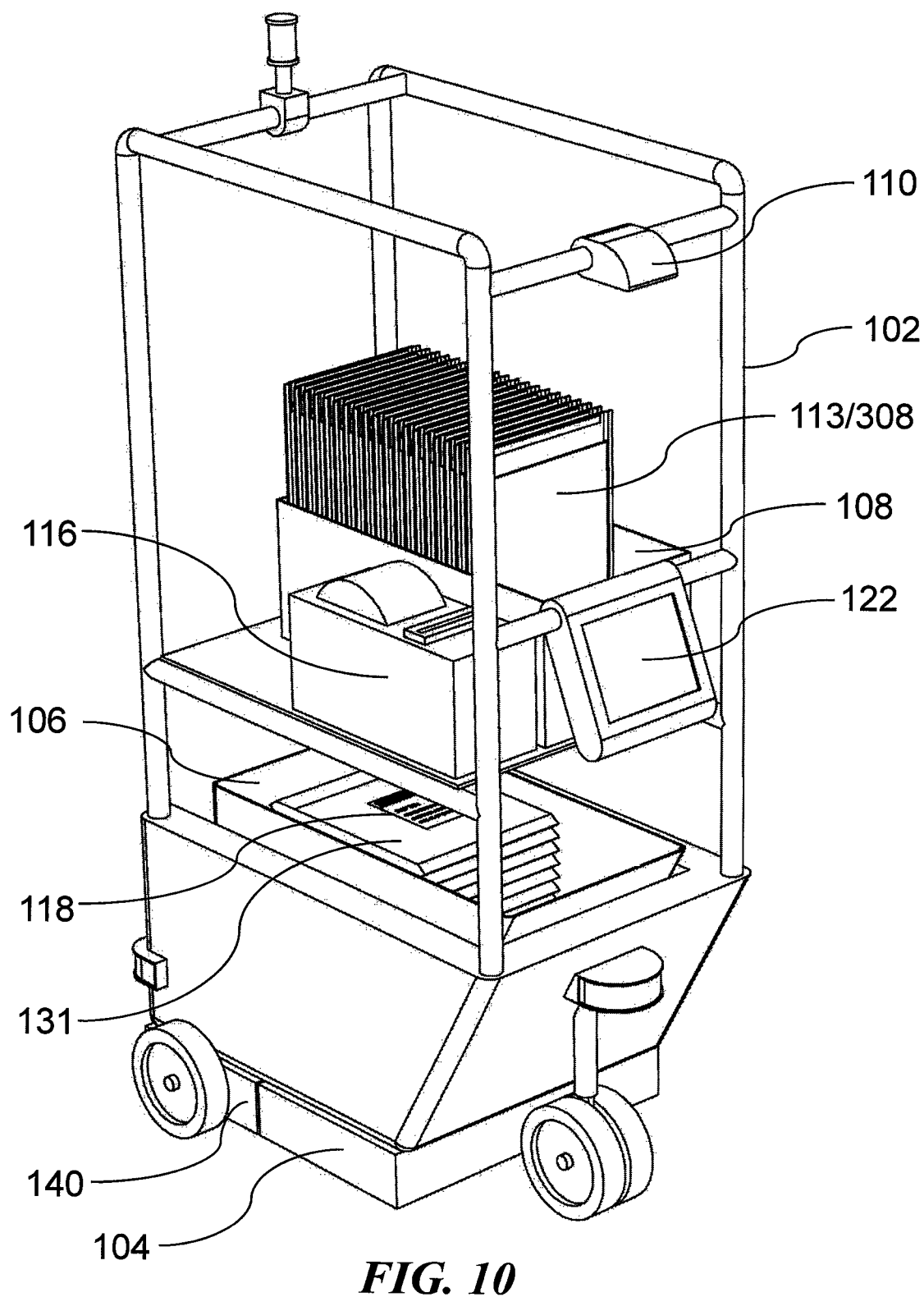
FIG. 10 is an isometric view of a mobile packaging cart containing mailer envelopes and a label printer that is moved adjacent to the storage location.

FIG. 10 illustrates a mobile packaging cart 102 of the mobile packaging system 100 (refer to FIG. 1A) which uses manual labor as the packaging subsystem 108. In the example packaging subsystem 108 in FIG. 10, the packaging material 113 is traditional mailer envelopes 308 to be manually packaged and sealed by the human operator to create the shipping container 131 containing an item 132 (refer to FIG. 6) therein. In another embodiment, manual labor is required as part of a labeling subsystem 116. The example labeling subsystem 116 in FIG. 10 is a label printer which prints a shipping container label 118 to be manually applied to the outer surface of the mailer envelope 308. In additional embodiments, other manual packaging methods are used as the packaging subsystem 108 of the mobile packaging cart 102, such as corrugated boxes, padded mailers, bags, shrink wrap, and the like. In further embodiments, additional packaging materials, such as bubble wrap, void fill, tape, and the like are stored on and used in conjunction with the other equipment and subsystems of the mobile packaging cart 102. Also shown are a display 122, an identification subsystem 110, a completed package storage location 106, a battery 104, and a drive unit 140. It shall further be appreciated by those of skill in the art that the packaging of items 132 (refer to FIG. 6) by the mobile packaging cart 102 may be used for reasons other than shipping, such as packaging for storage, kitting multiple items together, packaging for retail sale, or the like.

Figure 11:
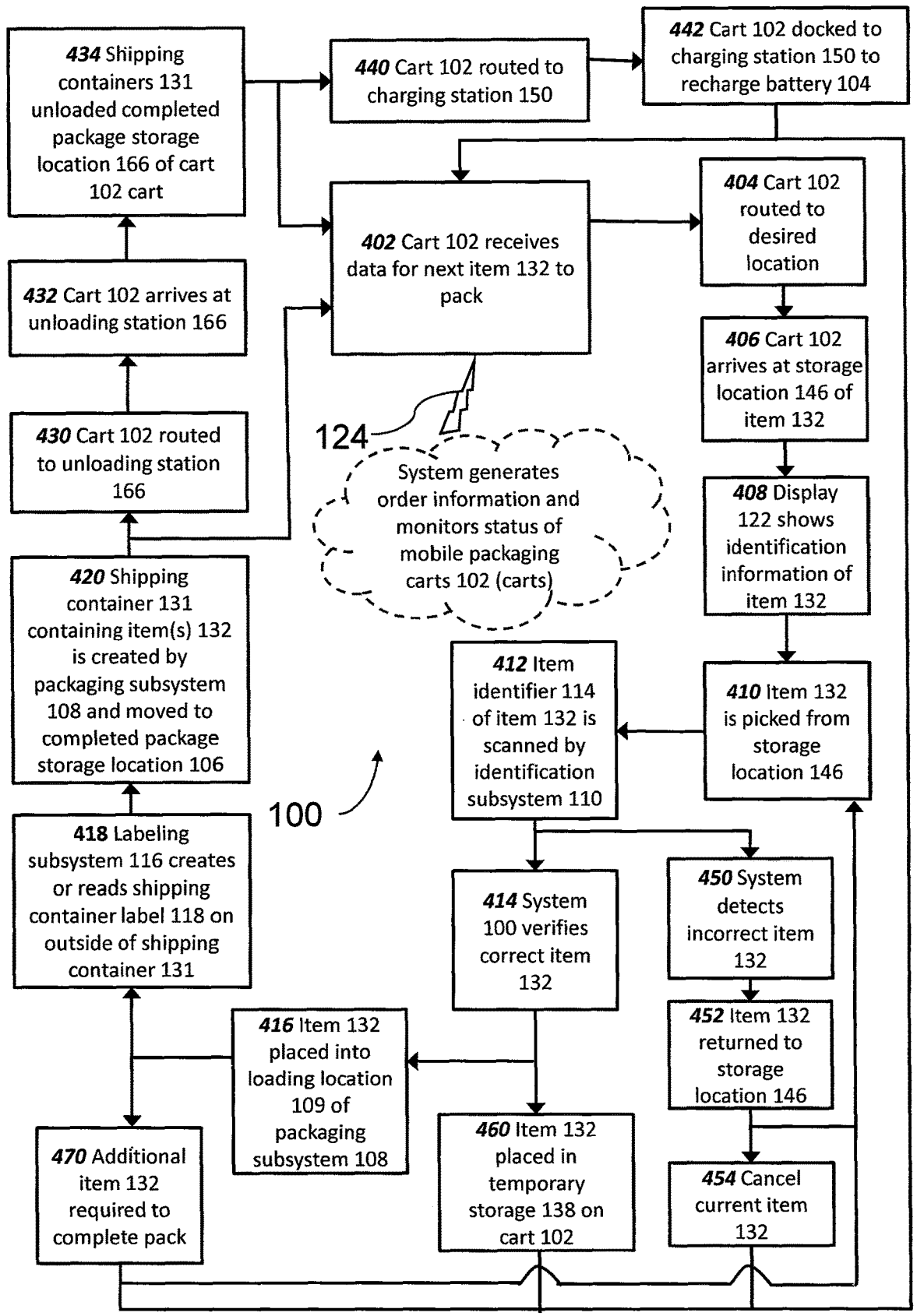
FIG. 11 is a flow diagram illustrating operation of a mobile packaging system.

FIG. 11 is a flow diagram of the mobile packaging system 100. The flow diagram depicted displays the process for a single mobile packaging cart 102 used as a part of the mobile packaging system 100. One of skill in the art will appreciate that the mobile packaging system 100 may be scaled to include any number of mobile packaging carts 102 with each mobile packaging cart 102 performing the process as illustrated. The mobile packaging system 100 is in communication with, or is a part of, a warehouse management system 400 (refer to FIG. 1A), or similar logistics or inventory system used to track inventory, process orders, and provide information of orders to be picked from inventory and packaged for shipping or further processing as previously described. The data required for an order to be picked, packaged, and shipped or further processed is sent to a mobile packaging cart 102 via the communication network 124. The mobile packaging system 100 can select which mobile packaging cart 102 to send the data to based on proximity to the storage location 146 of the item 132, the particular packaging subsystem 108 required, and the like. The selected mobile packaging cart 102 receives the data for the next item 132 (Step 402) and then is then routed, either manually or via an autonomous drive unit 140 (refer to FIG. 3), to the storage location 146 for the next item 132 (Step 404). Once the mobile packaging cart 102 arrives at the storage location 146 (Step 406), the display 122 of the mobile packaging cart 102 can indicate identification information of the item 132 (Step 408). The item 132 is then retrieved from the storage location 146, either manually by a human operator or by an autonomous picking device 136 (refer to FIG. 7) (Step 410) and the item identifier 114 of the item 132 is read by the reader 112 (refer to FIG. 1B) of the identification subsystem 110 (Step 412).

If the item identifier 114 does not match the information of the expected item 132 (Step 450), the unexpected item is returned to the storage location 146 (Step 452) or otherwise set aside for later processing to return to a proper storage location 146. Another attempt can be made to retrieve the correct item (Step 410) or the current instructions may be canceled (Step 454) and the mobile packaging cart 102 will be ready to receive instructions for the next item 132 (Step 402).

If the item identifier 114 does match the information of the expected item 132 (Step 414), the item 132 can be placed in temporary storage 138 of the mobile packaging cart 102 (Step 460) if the item 132 is to be combined with an additional item 132 in the same shipping container 131. The mobile packaging cart 102 is then ready to receive data for the next item 132 (Step 402). If the item 132 is to be individually packaged or is the last item to be retrieved from storage to be combined with one or more other items 132, the item 132 is placed into the loading location 109 of the packaging subsystem 108 (Step 416). If additional items 132 are to be included within the same shipping container 131 (Step 470), the items are individually retrieved from storage (Step 410), such as temporary storage 138 of the mobile packaging cart 102, read by the identification subsystem 110 (Step 412), verified to be the expected item (Step 414), and placed into the loading location 109 of the packaging subsystem 108 (Step 416) along with the previously picked item(s) 132. Alternatively, if additional item(s) 132 are to be the next to be retrieved from the corresponding storage location 146, the mobile packaging cart 102 will receive the data for the next item 132 (Step 402) and be routed to the storage location 146 and the item 132 retrieved and packaged as previously described along with the existing item(s) 132 already placed into the loading location 109 of the packaging subsystem 108.

As previously described in FIG. 8, an item 132 which is to be retrieved from a storage location 146 and temporarily stored on the mobile packaging cart 102, such as in temporary storage 138 or in the loading location 109 of the packaging subsystem 108, is referred to as a supplemental item 134 (in place of item 132) retrieved from a second storage location 149 (in place of storage location 146).

Continuing with the flow diagram of FIG. 11, after the item 132 has been verified by the identification subsystem 110 (Step 414) and placed into the loading location 109 of the packaging subsystem 108 (Step 416), the labeling subsystem 116 reads or creates a unique shipping container label 118 (Step 418) as previously described. The packaging subsystem 108 then processes the item(s) 132 to enclose the item(s) 132 within a shipping container 131 and moves the shipping container 131 containing the item(s) 132 therein to the completed package storage location 106 of the mobile packaging cart 102 (Step 420). The mobile packaging cart 102 is then ready to receive data for the next item 132 (Step 402), or alternatively the mobile packaging cart 102 is routed to the unloading station 166 (Step 430) such that after the mobile packaging cart 102 arrives at the unloading station 166 (Step 432) the shipping containers 131 are unloaded from the mobile packaging cart (Step 434) for shipping or further processing as previously described. After unloading all or a portion of shipping containers 131, the mobile packaging cart 102 is then ready to receive data for the next, item 132 (Step 402). Alternatively, the mobile packaging cart 102 can be routed to a charging station 150 (Step 440) and docked with the charging station 150 to recharge the battery 104 of the mobile packaging cart 102 (Step 442) prior to receiving data for the next item 132 (Step 402).

The flow chart as illustrated in FIG. 11 is an exemplary model of the operation of the present invention. As would be appreciated by one of skill in the art, the particular order of the illustrated steps may be rearranged or occur simultaneously while still keeping with the scope and spirit of the present invention. For example, the mobile packaging cart 102 can receive the data for the next item 132 (Step 402) prior to the completion of the processing and packaging of the current item 132 (Steps 404 through Steps 420). In a further example, the packaging of the item(s) 132 within a shipping container 131 (Step 420) can occur prior to or in concurrence with the reading or creation of the shipping container label 118 (Step 418). In an additional example, the mobile packaging cart 102 may be routed to the charging station 150 prior to unloading shipping containers 131 at the unloading station 166. One of skill in the art will additionally appreciate that the monitoring of location and status of the mobile packaging cart 102 by the mobile packaging system 100 allows the data for items 132 to be modified, canceled, reordered, and the like in order to increase efficiency of the overall mobile packaging system 100. It is also apparent by one of skill in the art that although the illustrated flow chart in FIG. 11 describes the use of a mobile packaging cart 102, the use of other configurations of mobile packaging carts 102 and mobile storage carts 202 (refer to FIG. 9A through 9B), or a combination of such, is also practicable within the scope of the invention as previously described.

Figure 12:
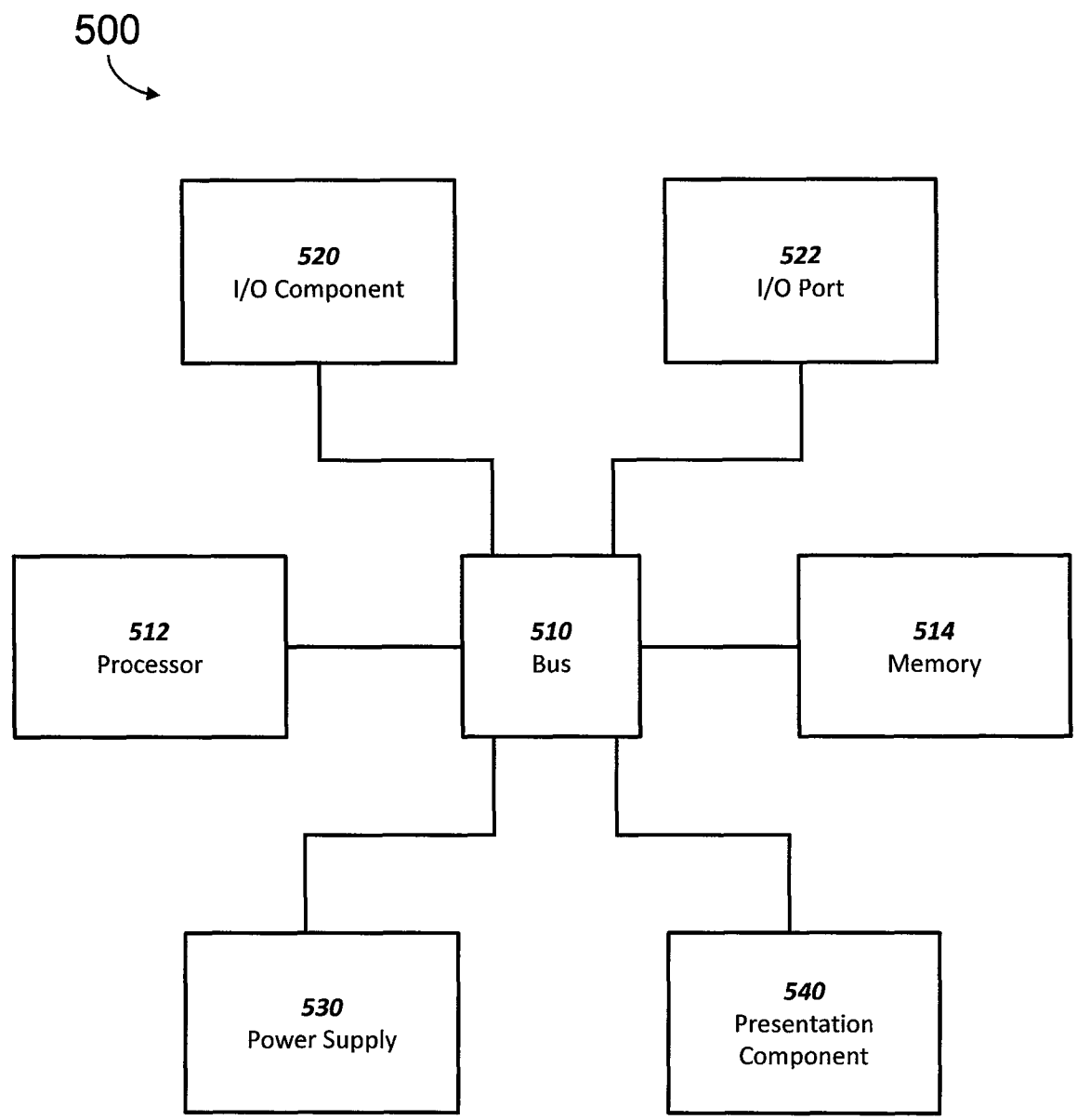
FIG. 12 is a diagrammatic illustration of a computing device and related hardware for use in a mobile packaging system.

FIG. 12 depicts an example electronic, computer, or computing device 500 that can be used to implement one or more aspects of the present invention, including the mobile cart controller 126 (refer to FIG. 1A), packaging subsystem 108 (refer to FIG. 1A), identification subsystem 110 (refer to FIG. 1B), labeling subsystem 116 (refer to FIG. 1C), drive unit 140 (refer to FIG. 3), steering system 141 (refer to FIG. 3), as well as other functionality described herein. The functionality and hardware of such computing device 500 may be implemented in any of the electronic hardware systems or subsystems described herein as involving or using a "computer" or "computing device" or the like, or related hardware for providing all or part of the described functionality, provided as a separate device or integrated into a system or subsystem described herein, as would be appreciated and understood by those of skill in the art. The terms "computer", "computing device", and the like utilized herein are intended to mean a processor at its most basic form, on up to more complex computing systems, including servers and cloud-based systems, in accordance with conventional meanings of such terms. However, for purpose of completeness, example components and related accessories that are intended to be encompassed by the use of the terms "computer", "computing device", "processor", and the like will be provided below in example nonlimiting form.

The computing device 500 is merely an illustrative example of a suitable computing environment and in no way limits the scope of the present invention. An "electronic device", "remote device," or "personal electronic device" as represented in figures and description herein, can include a "workstation," a "server," a "laptop," a "desktop," a "hand-held device," a "mobile device," a "tablet computer," a "processor," or other computing devices, as would be understood by those of skill in the art. Given that the computing device 500 is depicted for illustrative purposes, embodiments of the present invention may utilize any number of computing devices 500 in any number of different ways to implement a single embodiment of the present invention. Accordingly, embodiments of the present invention are not limited to a single computing device 500, as would be appreciated by one with skill in the art, nor are they limited to a single type of implementation or configuration of the example computing device 500.

The computing device 500 can include a bus 510 that can be coupled to one or more of the following illustrative components, directly or indirectly: a memory 514, one or more processors 512, one or more presentation components 540, input/output ports 522, input/output components 520, and a power supply 530. One of skill in the art will appreciate that the bus 510 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, the figures herein are merely illustrative of an exemplary computing device 500 that can be used to implement one or more embodiments of the present invention, and in no way limits the invention.

The computing device 500 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 500.

The memory 514 can include computer-storage media in the form of volatile and/or nonvolatile memory. The memory 514 may be removable, non-removable, or any combination thereof. Exemplary hardware devices are devices such as hard drives, solid-state memory, optical-disc drives, and the like. The computing device 500 can include one or more processors 512 that read data from components such as the memory 514, the various I/O components 520, etc. The one or more processors 512 may be part of or otherwise used in implementing the identification subsystem 110 (refer to FIG. 1B) as well as the packaging subsystem 108 (refer to FIG. 1A). Presentation component(s) 540 present data indications to a user or other device. Exemplary presentation components include a display device, speaker, printing component, vibrating component, etc.

The I/O ports 522 can enable the electronic or computing device 500 to be logically coupled to other devices, such as I/O components 520. Some of the I/O components 520 can be built into the computing device 500. Examples of such I/O components 520 include a sensor (including but not limited to: a camera, optical scanner, RFID scanner, or the like), keypad, touchpad, joystick, recording or storage device, game pad, satellite dish, scanner, printer, wireless device, networking device, and the like, as appropriate.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

In terms of use, a method of packaging includes an item 132 stored at a storage location 146 and a mobile packaging system 100 including a mobile packaging cart 102. The mobile packaging cart 102 includes a packaging subsystem 108, labeling subsystem 116, and completed package storage location 106. The mobile packaging cart 102 is positioned adjacent to the storage location 146 of an item 132. The item 132 is moved from the storage location 146 to the packaging subsystem 108, which then produces a shipping container 131 having the item 132 disposed therein. The labeling subsystem 116 applies a shipping container label 118 containing identifying information to shipping container 131. The labeled shipping container 131 is then moved to the completed package storage location 106 of the mobile packaging cart 102.

In terms of use, a method of packaging further includes the mobile packaging cart 102 including temporary storage 138. Prior to moving to the storage location 146 of the item 132, the mobile packaging cart 102 is positioned adjacent to a second storage location 149 containing a supplemental item 134. The supplemental item 134 is moved from the second storage location 149 to the temporary storage 138 of the mobile packaging cart 102. The mobile packaging cart 102 is then positioned adjacent to the storage location 146 of the item 132, and both the item 132 from the storage location 146 and the supplemental item 134 from temporary storage 138 are moved to the packaging subsystem 108. The packaging subsystem 108 produces a shipping container 131 having both the item 132 and supplemental item 134 disposed therein.

In terms of use, a method of packaging includes a mobile storage cart 202 containing a supplemental item 134 as part of the mobile packaging system 100 as previously described. After the mobile packaging cart 102 is positioned adjacent to the storage location 146 of an item 132, the mobile storage cart 202 is positioned adjacent to the mobile packaging cart 102 such that both the item 132 from the storage location 146 and the supplemental item 134 from the mobile storage cart 202 are moved to the packaging subsystem 108. The packaging subsystem 108 produces a shipping container 131 having both the item 132 and supplemental item 134 disposed therein.

What is claimed is:

1. A method for packaging, comprising:
   (a) providing a plurality of storage locations each said storage location containing a different item;
   (b) providing a mobile packaging system including:
      a mobile packaging cart positionable adjacent each of said plurality of storage locations, wherein said mobile packaging cart is about 2 feet wide, 3 feet long, and 5 feet tall, said mobile packaging cart including a battery;
      a packaging subsystem disposed on said mobile packaging cart, said packaging subsystem comprising a packaging material supply, a packaging material drive and a package sealer to form a package;
      a labeling subsystem disposed on said mobile packaging cart configured to apply a label to a packaging material;
      a completed package storage location disposed on said mobile packaging cart;
      a battery powered drive unit configured to autonomously propel said mobile packaging cart to said plurality of storage locations;
      a display configured to show said plurality of storage locations said mobile packaging cart is to be moved based on data received from a computing device;
   (c) positioning said mobile packaging cart adjacent one of said plurality of storage locations;
   (d) moving an item from said one of said plurality of storage locations to said packaging subsystem;
   (e) said packaging subsystem producing a shipping container having said item from said one of said plurality of storage locations disposed therein;
   (f) said labeling subsystem labeling said shipping container; and,
   (g) moving said shipping container to said completed package storage location.

2. The method of claim 1, further including:
   in (a), temporary storage disposed on said mobile packaging cart;
   providing a supplemental storage location which contains a supplemental item;
   before (c):
      positioning said mobile packaging cart adjacent said supplemental storage location;
      moving said supplemental item from said supplemental storage location to said temporary storage;
   in (d), also moving said supplemental item from said temporary storage to said packaging subsystem; and,
   in (e), said packaging subsystem producing a shipping container having both said item and said supplemental item disposed therein.

3. The method of claim 1, further including:
   providing a mobile storage cart, said mobile storage cart having a supplemental item;
   after (c), positioning said mobile storage cart adjacent said mobile packaging cart;
   in (d), also moving said supplemental item from said storage cart to said packaging subsystem; and,
   in (e), said packaging subsystem producing a shipping container having both said item and said supplemental item disposed therein.

4. The method of claim 1, further including:
   after (e), moving said mobile packaging cart to another of said plurality of storage locations.

5. A mobile packaging system, comprising:
   a plurality of storage locations;
   a different item disposed at each of said plurality of storage locations;
   a mobile packaging cart positionable adjacent each of said plurality of storage locations, wherein said mobile packaging cart is about 2 feet wide, 3 feet long, and 5 feet tall;
   a packaging subsystem disposed on said mobile packaging cart, said packaging subsystem comprising a packaging material supply, a packaging material drive and a package sealer to form a package;
   a labeling subsystem disposed on said mobile packaging cart configured to apply a label to a packaging material;
   a completed package storage location disposed on said mobile packaging cart;
   a battery powered drive unit configured to autonomously propel said mobile packaging cart to said plurality of storage locations; and
   a display configured to show said plurality of storage locations said mobile packaging cart is to be moved based on data received from a computing device.

6. The mobile packaging system according to claim 5, further including:

said completed package storage location including a removable storage tote.

7. The mobile packaging system according to claim 5, further including:

said mobile packaging cart including a handle configured to allow manual movement of said mobile packaging cart.

\* \* \* \* \*